United States Patent
Stout et al.

(10) Patent No.: US 7,521,635 B2
(45) Date of Patent: Apr. 21, 2009

(54) INSULATING WRAP

(75) Inventors: Boyd J. Stout, Bluffton (CA); Brian Impey, Breton (CA)

(73) Assignee: Gazelle's Oilfield Services Ltd., Alberta (CA)

( * ) Notice: Subject to any disclaimer, the term of this patent is extended or adjusted under 35 U.S.C. 154(b) by 0 days.

(21) Appl. No.: 11/418,428

(22) Filed: May 4, 2006

(65) Prior Publication Data

US 2006/0254807 A1    Nov. 16, 2006

(30) Foreign Application Priority Data

May 12, 2005    (CA)    .................. 2 507 938

(51) Int. Cl.
*H01B 17/00*    (2006.01)
(52) U.S. Cl. .............. 174/137 R; 174/138 R; 174/135; 174/149 R; 174/120 C; 174/138 C; 138/149; 138/99; 422/222; 156/143
(58) Field of Classification Search ............ 174/137 R, 174/137 A, 138 R, 135; 138/149, 150, 129, 138/130, 99, 110; 428/222; 156/143, 188
See application file for complete search history.

(56) References Cited

U.S. PATENT DOCUMENTS

| | | | | |
|---|---|---|---|---|
| 2,353,494 A | | 7/1944 | Patten et al. | |
| 2,425,800 A | * | 8/1947 | Hamilton, Jr. | ................. 72/466 |
| 3,616,123 A | * | 10/1971 | Reynolds et al. | ............ 428/222 |
| 3,687,765 A | | 8/1972 | MacLean et al. | |
| 4,073,317 A | | 2/1978 | Ellis | |
| 4,246,057 A | * | 1/1981 | Janowski et al. | ............ 156/150 |
| 4,293,005 A | | 10/1981 | Kelly | |
| 4,866,817 A | | 9/1989 | Espevik et al. | |
| 5,503,193 A | * | 4/1996 | Nygaard | ...................... 138/149 |
| 5,522,433 A | | 6/1996 | Nygaard | |
| 6,085,394 A | | 7/2000 | Hartman | |
| 6,119,314 A | | 9/2000 | Freed | |
| 6,907,907 B2 | * | 6/2005 | Maida | ......................... 138/149 |
| 6,955,190 B2 | * | 10/2005 | Koerner | ....................... 138/110 |

* cited by examiner

*Primary Examiner*—Dhiru R Patel
(74) *Attorney, Agent, or Firm*—Davis & Bujold, P.L.L.C.

(57) ABSTRACT

A insulating wrap includes a flexible elongate body of insulating material adapted to be wrapped in a helical fashion around an object, such as a pipe. The body has a first end and a second end. A first tie strap is secured by a first fastener to the first end of the body to facilitate the body being secured to the pipe. A second tie strap is secured by a second fastener to the second end of the body to facilitate the body being secured to the pipe.

7 Claims, 2 Drawing Sheets

INSULATING WRAP

This application claims priority from Canadian Application Serial No. 2,507,938 filed May 12, 2005.

FIELD OF THE INVENTION

The present invention relates to an insulating wrap, adapted to be wrapped around pipes, hose, conduit, and other objects.

BACKGROUND OF THE INVENTION

Insulation is wrapped around pipes to thermally insulate them. Patents relating to such practises include: U.S. Pat. No. 2,353,494, (Patten et al 1944) and U.S. Pat. No. 5,522,433, (Nygaard 1996).

SUMMARY OF THE INVENTION

According to the present invention there is provided an insulating wrap, which includes a flexible elongate body of insulating material adapted to be wrapped in a helical, overlapping fashion around an object. The body has a first end and a second end. A first flexible tie strap is secured by a first fastener to the first end of the body to facilitate the body being secured to the object. A second flexible tie strap is secured by a second fastener to the second end of the body to facilitate the body being secured to the object.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
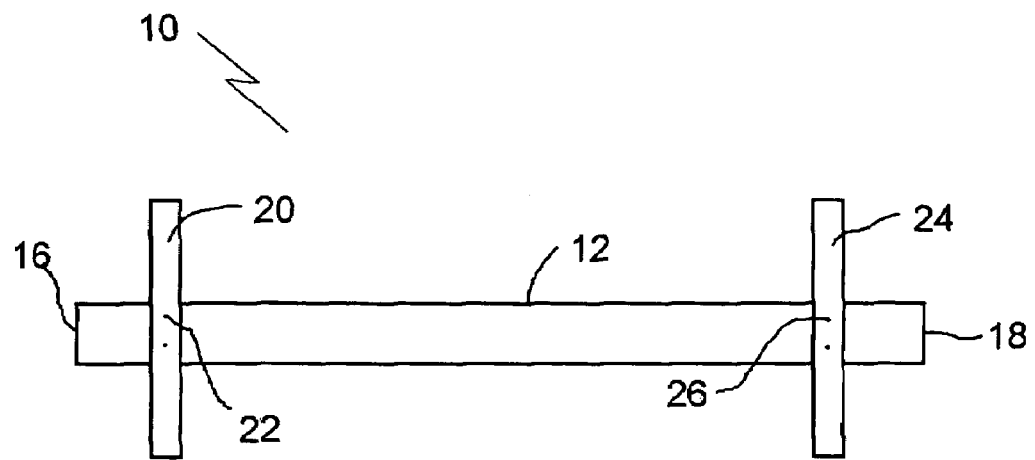
FIG. 1 is a perspective view of a first embodiment of insulating wrap fabricated in accordance with the teachings of the present invention.

A first embodiment of insulating wrap, generally identified by reference numeral 10, will now be described with reference to FIGS. 1 and 2. A second embodiment of insulating wrap, generally identified by reference numeral 100, will then be described with reference to FIGS. 3 and 4.

Structure and Relationship of Parts of Insulating Wrap 10:

Referring to FIG. 1, insulating wrap 10 includes a flexible elongate body 12 of insulating material. Referring to FIG. 2, body 12 is adapted to be wrapped in a helical fashion around a pipe 14. Referring to FIG. 1, body 12 has a first end 16 and a second end 18. A first tie strap 20 is secured by a first fastener 22 to first end 16 of body 12. A second tie strap 24 is secured by a second fastener 26 to second end 18 of body 12. It will be appreciated that for this embodiment of the invention with a "fixed" strap, that there are a variety of fasteners which can be used for fixing the strap, including: sewing, gluing, tape fasteners, rivets, and the like.

Figure 2:
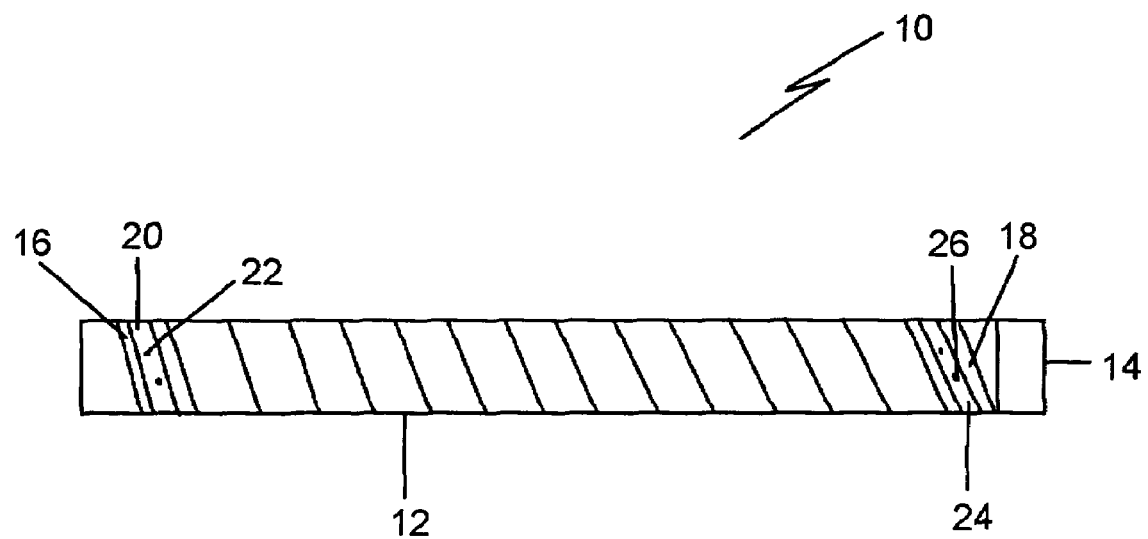
FIG. 2 is a side elevation view of the insulating wrap illustrated in FIG. 1 installed on a pipe.

Operation of Insulating Wrap 10:

Referring to FIG. 2, first end 16 of body 12 is secured to pipe 14 by means of first tie strap 20. Body 12 is then wrapped around pipe 14 in a helical fashion. Second end 18 of body 12 is then secured to pipe 14 by means of second tie strap 24. In the prior art, there were times when a shortage of tape or strapping material at remote locations interfered with completion of the insulation installation. Having straps permanently attached to the body avoids such installation problems.

Structure and Relationship of Parts of Insulating Wrap 100:

The structure of insulating wrap 100 is identical in many respects to that of insulating wrap 10. For that reason, identical reference numerals have been used to identify identical components. Insulating wrap 100 differs from insulating wrap 10 with respect to the properties of the fastener used.

Figure 3:
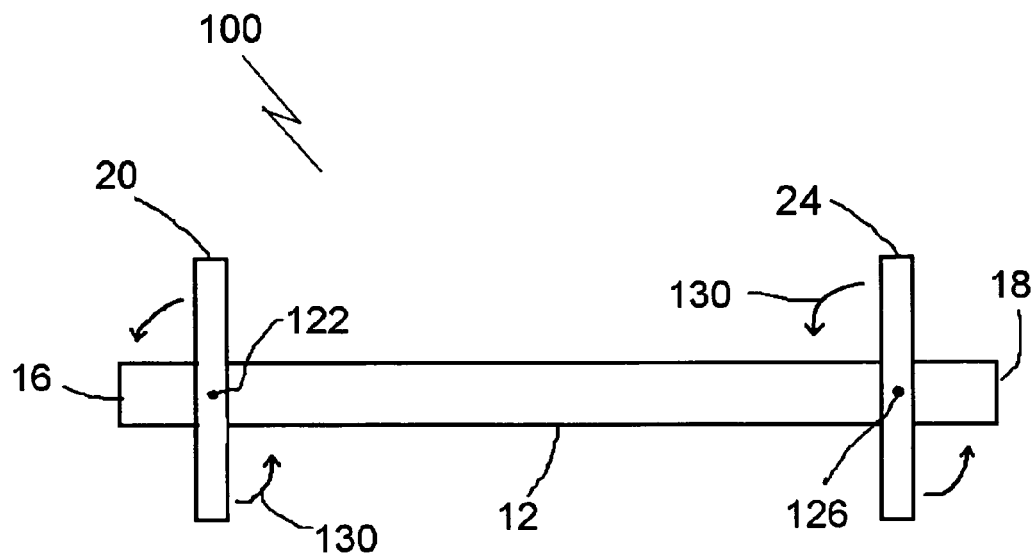
FIG. 3 is a perspective view of a second embodiment of insulating wrap fabricated in accordance with the teachings of the present invention.
Figure 4:
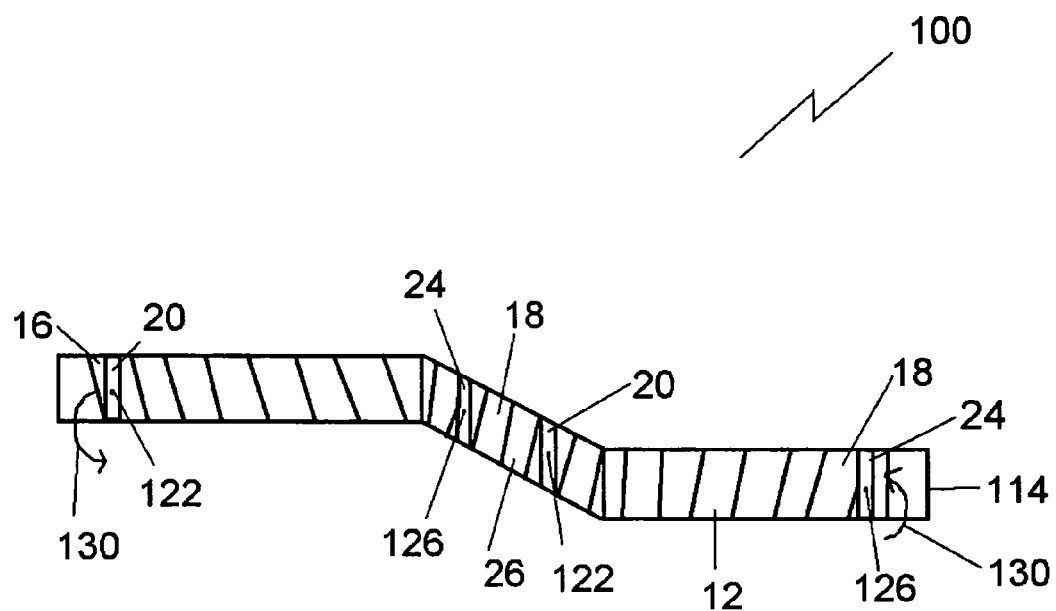
FIG. 4 is a side elevation view of the insulating wrap illustrated in FIG. 3 installed on a pipe.

Referring to FIG. 3, insulating wrap 100 includes a flexible elongate body 12 of insulating material. Referring to FIG. 4, body 12 is adapted to be wrapped in a helical fashion around a pipe 114. Referring to FIG. 3, body 12 has a first end 16 and a second end 18. A first tie strap 20 is secured by a first fastener 122 to first end 16 of body 12. A second tie strap 24 is secured by a second fastener 126 to second end 18 of body 12. It is to be noted that first fastener 122 accommodates relative rotational movement between first tie strap 20 and body 12, as indicated by arrows 130. Similarly, second fastener 126 accommodates relative rotational movement between second tie strap 24 and body 12, as indicated by arrows 130.

Operation of Insulating Wrap 100:

Referring to FIG. 4, first end 16 of body 12 is secured to pipe 114 by means of first tie strap 20. Unlike pipe 14 illustrated in FIG. 2, pipe 114 illustrated in FIG. 4 does not have a similar linear configuration. In order to adjust to the angle of incline of pipe 114, first fastener 122 permits rotational movement of first tie strap 20 relative to body 12, as indicated by arrows 130. Body 12 is then wrapped around pipe 114 in a helical fashion. Second end 18 of body 12 is then secured to pipe 114 by means of second tie strap 24. Similarly, in order to adjust to the angle of incline of pipe 114, second fastener 126 permits rotational movement of second tie strap 24 relative to body 12, as indicated by arrows 130. This ability to rotate either first tie strap 20, second tie strap 24 or both relative to body 12 allows non-linear pipe installations to be accommodated.

It will be appreciated that although a pipe has been illustrated the insulating wrap described can be used with any elongated conduit or hose. The insulating wrap has also been wrapped around tanks and other objects.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. Insulating wrap, comprising:
   a flexible elongate body of insulating material adapted to be wrapped in a helical, overlapping fashion around an object, and the body having a first end and a second end;

a first tie strap secured by a first fastener to the first end of the body to facilitate the body being secured to the object; and a second tie strap secured by a second fastener to the second end of the body to facilitate the body being secured to the object;

wherein the first tie strap and the second tie strap are flexible, at least one of the first fastener or the second fastener comprising a single centrally positioned fastener pivotally securing one of the first tie strap or the second tie strap to the body and accommodating relative rotational movement between one of the first tie strap or the second tie strap and the body, thereby allowing the angle of one of the first tie strap or the second tie strap relative to the body to be angularly adjusted.

2. The insulating wrap as defined in claim 1, wherein the flexible elongate body of insulating material is substantially a planar material which facilitates wrapping the flexible elongate body in a helical, overlapping fashion around the object.

3. The insulating wrap as defined in claim 1, wherein each of the first flexible and the second flexible tie straps has a length which is greater than a perimeter of the object, but less than a length of the object, to facilitate tying of the first and the second tie straps around the object.

4. Insulating wrap, comprising:

a flexible elongate body of insulating material adapted to be wrapped in a helical, overlapping fashion around an object, and the body having a first end and a second end;

a flexible first tie strap immovably affixed by a first fastener to the first end of the body to facilitate the body being secured to the object; and a flexible second tie strap immovably affixed by a first fastener to the second end of the body to facilitate the body being secured to the object;

wherein the first tie strap and the second tie strap are flexible, at least one of the first fastener or the second fastener comprising a single centrally positioned fastener pivotally securing one of the first tie strap or the second tie strap to the body and accommodating relative rotational movement between one of the first tie strap or the second tie strap and the body, thereby allowing the angle of one of the first tie strap or the second tie strap relative to the body to be angularly adjusted.

5. The insulating wrap as defined in claim 4, wherein the flexible elongate body of insulating material is substantially a planar material which facilitates wrapping the flexible elongate body in a helical, overlapping fashion around the object.

6. The insulating wrap as defined in claim 4, wherein each of the first flexible and the second flexible tie straps has a length which is greater than a perimeter of the object, but less than a length of the object, to facilitate tying of the first and the second tie straps around the object.

7. Insulating wrap, comprising:

a flexible elongate body of insulating material adapted to be wrapped in a helical fashion around an object, the body having a first end and a second end;

a first tie strap secured by a first fastener to the first end of the body to facilitate the body being secured to the object, the first fastener accommodating relative rotational movement between the first tie strap and the body, thereby allowing the angle of the first tie strap relative to the body to be angularly adjusted; and a second tie strap secured by a second fastener to the second end of the body to facilitate the body being secured to the object, the second fastener accommodating relative rotational movement between the second tie strep and the body, thereby allowing the angle of the second tie strap relative to the body to be angularly adjusted.

\* \* \* \* \*